United States Patent [19]
Machida

[11] Patent Number: 5,812,845
[45] Date of Patent: Sep. 22, 1998

[54] METHOD FOR GENERATING AN OBJECT CODE FOR A PIPELINE COMPUTER PROCESS TO REDUCE SWAPPING INSTRUCTION SET

[75] Inventor: Hirohisa Machida, Tokyo, Japan

[73] Assignee: Mitsubishi Denki Kabushiki Kaisha, Tokyo, Japan

[21] Appl. No.: 719,545

[22] Filed: Sep. 25, 1996

[30] Foreign Application Priority Data

May 13, 1996 [JP] Japan ................................ 8-117537

[51] Int. Cl.[6] ................................ G06F 9/315; G06F 9/30
[52] U.S. Cl. ............... 395/705; 364/736.05; 364/736.01; 711/169; 711/125; 395/706; 395/898; 395/566; 395/564; 395/565; 395/800.41; 395/394
[58] Field of Search ................................ 395/705, 706, 395/800.33, 800.36, 800.41, 376, 392, 394, 561, 566, 564, 565, 569; 364/736.01, 736.04, 736.05; 711/169, 125

[56] References Cited

U.S. PATENT DOCUMENTS

| | | | |
|---|---|---|---|
| 5,404,552 | 4/1995 | Ikenaga | 395/800.41 |
| 5,522,052 | 5/1996 | Inoue et al. | 395/392 |
| 5,636,353 | 6/1997 | Ikenaga et al. | 395/394 |
| 5,684,983 | 11/1997 | Ando | 395/566 |

FOREIGN PATENT DOCUMENTS 60-181837  9/1985  Japan .
6-242953  9/1994  Japan .

*Primary Examiner*—Emanuel Todd Voeltz
*Assistant Examiner*—Tuan Q. Dam
*Attorney, Agent, or Firm*—Oblon, Spivak, McClelland, Maier & Neustadt, P.C.

[57] ABSTRACT

A computer of a pipeline type is provided in which a processing of exchanging data stored in two data storing portions can be performed at a high speed by adding a comparatively simple circuit structure without increasing the operation processing time of an instruction executing portion. An exclusive-OR gate executes the exclusive-OR of the ordinary operation result (ALU operation result) on the E-stage stored in an operation result register and data stored in a bus register, and outputs the EXOR operation result to a selector. The selector outputs one of the EXOR operation result and the ALU operation result stored in the operation result register based on SWAP indication information stored in a register for SWAP instructions.

12 Claims, 11 Drawing Sheets

```
CM1 : swapex $1, $2 (<=> exor $1←$1,$2)
CM2 : exor $2←$1,$2
```

```
CM1 : $1=$1 exor ($1 exor $2)=$2
CM2 : $2=$2 exor ($1 exor $2)=$1
```

FIG. 6

```
CM1 : swapex $1, $2(<=>$1←$2)
CM2 : exor $2←$1,$2
```

FIG. 7

```
CM1 : $1=$2
CM2 : $2=$2 exor ($1 exor $2)=$1
```

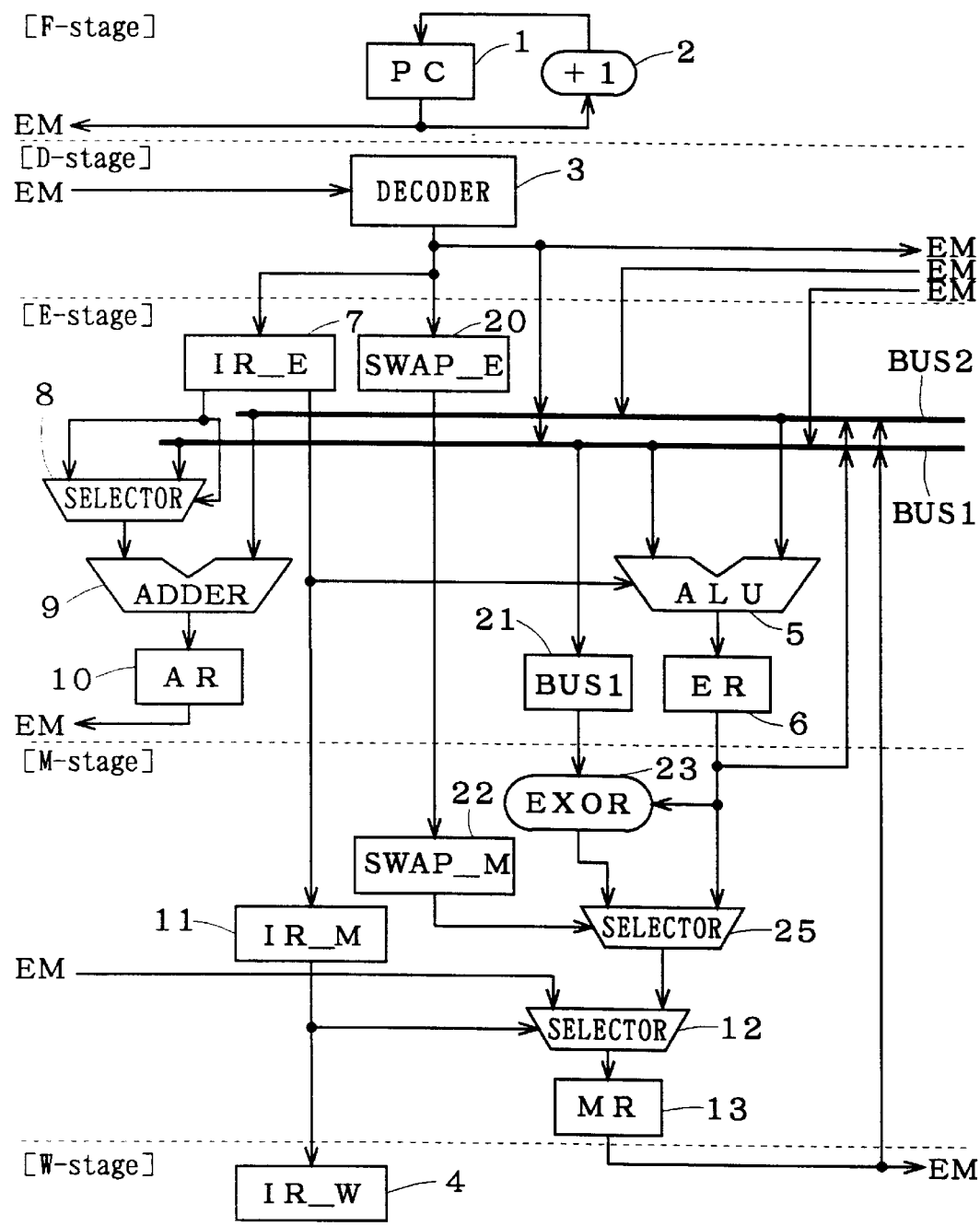
F I G. 1 0

```
CM11 : $3 ← $1 + $2
CM12 : $5 ← $3 - $4
```

```
CM21 : $3 ← $1 ( $3 ← $1 + $0 )
CM22 : $1 ← $2 ( $1 ← $2 + $0 )
CM23 : $2 ← $3 ( $2 ← $3 + $0 )
```

METHOD FOR GENERATING AN OBJECT CODE FOR A PIPELINE COMPUTER PROCESS TO REDUCE SWAPPING INSTRUCTION SET

BACKGROUND OF THE INVENTION

1. Field of the Invention

The present invention relates to a high performance computer of a single instruction—pipeline type.

2. Description of the Background Art

The instruction execution process of a general computer comprises a processing of fetching (reading out) an instruction from a memory, a processing of decoding (interpreting) the instruction, a processing of fetching data from the memory, a processing of executing an operation based on the fetched data, and a processing of writing the result of the operation back to the memory. For the next instruction, furthermore, the above-mentioned instruction execution process is performed.

In order to increase the speed of a computer having the above-mentioned instruction execution process, continuous instruction strings are overlapped with each other on a time axis and processed, and components which restrict the speed of the computer are always kept in the operating state. A pipeline processing can implement an increase in the speed of the computer.

The pipeline processing will be briefly described below with reference to FIG. 12. The typical instruction processing of a computer can be divided into several stages. FIG. 12 shows an example of division in MIPS-R3000 computer developed by MIPS Co., Ltd. (hereinafter referred to as a "R3000" which has been described in detail in "mips RISC ARCHITECTURE", GERRY KANE). In the example of FIG. 12, the instruction processing is divided into the following five stages.

(1) F-stage Fetch an instruction
(2) D-stage: Decode the instruction and fetch data from a register
(3) E-stage: Operation (ALU)
(4) M-stage Access a memory
(5) W-stage: Write results Since the above-mentioned 5-stage processings use different areas (also referred to as resources) in the computer, they can be overlapped with each other on the time axis. Although the time for five stages is required in order to complete an instruction, thus, a processing for each instruction is completed whenever the time for each stage passes over the whole computer as shown in FIG. 13. Accordingly, R3000 is referred to as a computer of a pipeline type having five stages.

The operation of the computer of a pipeline type shown in FIG. 12 will be briefly described below. At the F-stage, an instruction is fetched from an external memory EM according to the value of a program counter (PC) 1. Every time a processing for a unit stage is completed, an incrementer 2 increases the value of the program counter 1 by 1 so that the next instruction is fetched.

At the D-stage, the instruction fetched into the external memory EM is decoded by a decoder 3, and the contents of a processing are decided to issue an instruction. Every time a processing is completed, the instruction is transferred to the next stage so that a processing necessary for the stage is performed. The instruction is transferred through an instruction register 7 in the example shown in FIG. 12.

At the D-stage, necessary data are read out from a register file 4 simultaneously with instruction decoding. In this case, at most two data are read out from the register file 4. The reason is that the computer basically processes two data to obtain a result. Two data which have not been processed are referred to as source data, and data which has been processed is referred to as destination data. In some cases, the source data is not data stored in the register file 4 but immediate data which is designated by an instruction depending on the kind of the instruction. In those cases, the source data is designated by the decoder 3.

At the E-stage, an operation processing is performed for the read-out data by using an ALU 5. The ALU 5 performs a processing according to an instruction designated by an instruction register 7. In the processing performed at the E-stage, some instructions calculate addresses of data read out from the external memory EM (the addresses of data to be written to the external memory EM). Some computers execute address calculation by using the ALU, and some computers execute the address calculation by using special purpose arithmetic units other than the ALU. As shown in FIG. 12, R3000 executes the address calculation by using a special purpose adder 9 as shown in FIG. 12. The adder 9 also decides a processing according to the instruction register 7. An operation result register 6 stores the result of an operation obtained by the ALU 5. An addition result register 10 stores the result of addition obtained by the adder 9. The data stored in the operation result register 6 is transferred as the output result of the E-stage to the M-stage.

A part of data stored in the instruction register 7 are given as control data to a selector 8. Another part of data are given as input data to the selector 8. The selector 8 receives data on a bus BUS1 and another part of data stored in the instruction register 7, and outputs one of them to one of inputs of the adder 9.

At the M-stage, a processing of reading out data from the external memory EM (writing data to the external memory EM) is performed according to the address data of the addition result register 10 in case of an instruction which accesses the external memory EM. In case of instructions other than the instruction which accesses the external memory EM, processings are not particularly performed at the M-stage but the result of a processing obtained at the E-stage is transferred to the W-stage. In case of an instruction which reads out data from the external memory EM, the read-out data is selected by a selector 12 as the result of the processing of the M-stage. In case of other instructions, the result of the E-stage stored in the operation result register 6 is selected and stored as the result of the processing of the M-stage in the output result register 13. The selector 12 operates according to the data stored in the instruction register 11. The data stored in the output result register 13 is transferred as the output result of the M-stage to the W-stage.

At the W-stage, the result is written to the register file 4. Only one data is usually written to the register file 4.

As described above, the computer of a pipeline type according to the prior art is referred to as a 3-operand (having the same meaning as that of data) instruction system computer because it processes two input data at the E-stage and generates one output data.

A bypass technique which is often utilized for the computer of a pipeline type will be described below. Instruction strings shown in FIG. 14 will be considered. An instruction CM11 means that the value of a register $1 and that of a register $2 are added and the result of addition is stored in a register $3. An instruction CM12 means that the value of a register $4 is subtracted from that of the register $3 and the result of subtraction is stored in a register $5. The value of the register $3 which is used by the instruction CM12 is the result of addition of the instruction CM 11.

If the instruction strings are processed by the computer of a pipeline type, the following problem arises. While the instruction CM12 is being processed at the E-stage, the instruction CM11 is being processed at the M-stage. Consequently, the result of the instruction CM11 has not been written to the register file 4. Accordingly, the data of the register $3 that is used by the instruction CM12 which is being processed at the E-stage is not data which is modified by the result of the instruction CM11 but data stored in the register $3 prior thereto. Thus, accurate operations cannot be executed.

In order to avoid such a problem, the computer of a pipeline type utilizes a bypass method. More specifically, a bypass path is provided in such a manner that the results of the E-stage and the M-stage can be utilized prior to the data read out from the register file 4 if data is referred to before the same data is written to the register file 4 at the final stage, that is, the W-stage. The bypass path is shown by a broken line arrow in FIG. 12. With such a structure, the instruction strings shown in FIG. 14 can be executed consistently.

It is assumed that a computer having the bypass path executes an instruction SWAP given by a source code that exchanges two data stored in the register file, for example, data stored in the registers $1 and $2. As a method for implementation, FIG. 15 shows the structure of an object code instruction.

As shown in FIG. 15, an object code comprising three instructions CM21 to CM23 is generated for a source code SWAP instruction. By the instruction CM21, one of the data stored in the registers $1 and $2 is transferred to another register (the register $3 shown in an example of FIG. 15). Then, the data stored in the register $2 is stored in the register $1 by the instruction CM22. Finally, the data stored in the register $3 is moved to the register $2 by the instruction CM23. Thus, the data stored in the registers $1 and $2 are completely exchanged.

In some cases, instructions used for movement simply have a MOV (movement) instruction. However, the computer according to the prior art should have a smaller number of instructions to enhance efficiency. For this reason, an addition instruction is substituted for the MOV instruction. As shown in parentheses of FIG. 15, the result obtained by adding the value of the register $1 and "0" is stored in the register $2 if the data of the register $1 should be moved to the register $2. In this case, the value of the register $1 and an immediate value of zero may be added. Since most computers (for example, the above-mentioned R3000) have the value of a register $0 fixed to zero, the data stored in the register $1 and the data stored in the register $0 may be added and the result of addition may be stored in the register $2. Thus, it is necessary for the computer according to the prior art to process three instructions as an object code for exchanging the data of the registers.

It is assumed that a computer can perform the SWAP operation at the highest speed, that is, by an instruction. In order to perform the SWAP operation by the instruction, an ALU 5' needs two output ports at the E-stage as shown in FIG. 16. Two operation result registers 15 and 16 are provided on the E-stage and two output result registers 17 and 18 are provided on the M-stage corresponding to the output ports of the ALU 5'. For simplicity, only portions necessary for description are shown in FIG. 16. In particular, a portion which accesses the external memory EM is omitted. The components of the computer shown in FIG. 12 are provided even though they are not shown.

At the E-stage, the ALU 5' processes two input data and generates two output data. Therefore, the computer has a 4-operand instruction system structure. Thus, special functions are necessary for executing the SWAP instruction by the object code of an instruction. Accordingly, the structure of the ALU 5' is different from that of an ALU of the computer according to the prior art. Furthermore, the ALU 5' has more functions. Consequently, a quantity of hardware is increased and the structure becomes more complicated so that the processing cannot be performed at a high speed. Ordinarily, the ALU 5' is the slowest circuit, that is, an element which decides the cycle time in the computer of a pipeline type. For this reason, a loss caused by excessively increasing the circuit structure of the ALU 5' to take more processing time cannot be ignored.

In case of the 4-operand instruction system computer, two data are written to the register file 4. Therefore, the register file 4 needs two write ports and two kinds of bypass paths are necessary. Consequently, the quantity of hardware is twice as much as that of the prior art so that the structure becomes very complicated. A program to be processed by the computer has some SWAP instructions. Accordingly, it is not practical at all that a lot of hardware is prepared in order to execute rare SWAP instructions at a high speed so that the processing time of the ALU 5' is increased. Under the circumstances, the 4-operand instruction system computer has not been actually manufactured.

As described above, three instructions should be executed as an object code in order to execute the SWAP instruction in the 3-operand instruction system computer according to the prior art.

SUMMARY OF THE INVENTION

A first aspect of the present invention is directed to a computer which has first and second data storing portions and receives, from the outside, an instruction including a SWAP instruction that indicates the exchange of information stored in the first and second data storing portions respectively to perform a processing of exchanging the information of the first and second data storing portions respectively if the instruction is the SWAP instruction, the SWAP instruction comprising first and second partial instructions which are executed in this order, the computer comprising an instruction decoding portion for receiving the instruction to output, to the next stage, instruction information which indicates a first exclusive-OR operation processing and SWAP indication information which indicates the first partial instruction and to output first and second information stored in the first and second data storing portions respectively to first and second buses if the instruction is the first partial instruction of the SWAP instruction, as well as to output, to the next stage, instruction information which indicates a second exclusive-OR operation processing and SWAP indication information which indicates the second partial instruction if the instruction is the second partial instruction of the SWAP instruction, an instruction executing portion provided on the next stage of the instruction decoding portion for receiving the instruction information and the SWAP indication information to exactly output the instruction information and the SWAP indication information to the next stage, said instruction executing portion storing the data on the first bus in a bus data storing portion and outputting, to the next stage and the first bus, the instruction execution operation result obtained by executing the exclusive-OR operation of the respective data on the first and second buses when the instruction information indicates the first exclusive-OR operation processing, as well as outputting, to the next stage, the instruction execution operation result obtained by executing the exclusive-OR operation of the respective data on the first and second buses when the instruction information indicates a second exclusive-OR operation processing, and a data writing portion provided on the next stage of the instruction executing portion for receiving the instruction information and the SWAP indication information to store, as write data, the result of the exclusive-OR operation of the data stored in the bus data storing portion and the instruction execution operation result in the first data storing portion when the SWAP indication information indicates the first partial instruction, and to store the execution instruction operation result as write data in the second data storing portion when the instruction information indicates the second exclusive-OR operation processing and the SWAP indication information indicates the second partial instruction, wherein a pipeline parallel processing is performed for the first and second partial instructions in order of the instruction decoding portion, the instruction executing portion and the data writing portion.

A second aspect of the present invention is directed to a computer which has first and second data storing portions and receives, from the outside, an instruction including a SWAP instruction that indicates the exchange of information stored in the first and second data storing portions respectively to perform a processing of exchanging the information of the first and second data storing portions respectively if the instruction is the SWAP instruction, the SWAP instruction comprising first and second partial instructions which are executed in this order, the computer comprising an instruction decoding portion for receiving the instruction, to output, to the next stage, instruction information which indicates a first exclusive-OR operation processing and SWAP indication information which indicates the first partial instruction and to output first and second information stored in the first and second data storing portions respectively to first and second buses if the instruction is the first partial instruction of the SWAP instruction, as well as to output, to the next stage, instruction information which indicates a second exclusive-OR operation processing and SWAP indication information which indicates the second partial instruction if the instruction is the second partial instruction of the SWAP instruction, an instruction executing portion provided on the next stage of the instruction decoding portion for receiving the instruction information and the SWAP indication information to exactly output the instruction information and the SWAP indication information to the next stage, said instruction executing portion storing the data on the second bus in a bus data storing portion and outputting, to the first bus, the instruction execution operation result obtained by executing the exclusive-OR operation of the respective data on the first and second buses when the instruction information indicates the first exclusive-OR operation processing or the SWAP indication information indicates the first partial instruction, as well as outputting, to the next stage, the instruction execution operation result obtained by executing the exclusive-OR operation of the respective data on the first and second buses when the instruction information indicates a second exclusive-OR operation processing, and a data writing portion provided on the next stage of the instruction executing portion for receiving the instruction information and the SWAP indication information to store the data stored in the bus data storing portion as write data in the first data storing portion when the SWAP indication information indicates the first exclusive-OR operation processing, and to store the execution instruction operation result as write data in the second data storing portion when the instruction information indicates the second exclusive-OR operation processing and the SWAP indication information indicates the second partial instruction, wherein a pipeline parallel processing is performed for the first and second partial instructions in order of the instruction decoding portion, the instruction executing portion and the data writing portion.

A third aspect of the present invention is directed to the computer wherein the instruction executing portion may store the data on the second bus in the bus data storing portion when the instruction information indicates a second exclusive-OR operation processing.

A fourth aspect of the present invention is directed to the computer wherein the instruction executing portion may include an adding portion having an adder and an addition result storing portion, and selecting means for storing the data on the second bus in the addition result storing portion when the SWAP indication information indicates the first partial instruction, and for storing the addition result of the adder in the addition result storing portion when the SWAP indication information does not indicate the first partial instruction, the addition result storing portion being defined as the data storing portion, and wherein the data writing portion may fetch the data on the second bus from the addition result storing portion when the SWAP indication information indicates the first partial instruction.

A fifth aspect of the present invention is directed to the computer wherein the instruction executing portion may include an adding portion having an addition result storing portion, cause the adding portion to execute addition of "0" and the data on the second bus and store the result of addition in the addition result storing portion when the SWAP indication information indicates the first partial instruction, the addition result storing portion being defined as the data storing portion, and wherein the data writing portion may fetch the data on the second bus from the addition result storing portion when the SWAP indication information indicates the first partial instruction.

A sixth aspect of the present invention is directed to the computer wherein the first and second data storing portions may include first and second registers.

A seventh aspect of the present invention is directed to the computer wherein the first and second data storing portions may include first and second storing areas of an external memory.

An eighth aspect of the present invention is directed to a compiler for generating an object code for a computer capable of pipeline parallel execution of an operation executing processing and a data writing processing which are continuously performed, based on a source code comprising a group of instructions which include a SWAP instruction that indicates the exchange of the contents of first and second information stored in first and second data storing portions respectively, the complier generating, as an object code for an instruction that indicates the SWAP instruction in the source code, a first partial instruction which indicates to execute the exclusive-OR of the first and second information stored in the first and second storing portions respectively so as to obtain a first operation result when performing the operation processing, and indicates to write the same information having the same value as that of the second information to the first storing portion when performing the data writing processing, and a second partial instruction which is executed subsequently to the first partial instruction and indicates to execute the exclusive-OR operation of the second information and the first operation result so as to obtain a second operation result when performing the operation processing and to write the second operation result to the second storing portion when performing the data writing processing.

A ninth aspect of the present invention is directed to the compiler wherein the same information may include operation result data obtained by the exclusive-OR of the first information and the first operation result.

A tenth aspect of the present invention is directed to the compiler wherein the same information may include the second information itself.

According to the first aspect of the present invention, the instruction executing portion outputs the instruction execution operation result obtained by executing the exclusive-OR operation of the first and second information on the first and second buses to the first bus and the data writing portion on the next stage, and the data writing portion stores the result of the exclusive-OR operation of the first information stored in the bus data storing portion and the instruction execution operation result as write data in the first storing portion in the processing performed based on the first partial instruction of the SWAP instruction (when the instruction information indicates the first exclusive-OR operation and the SWAP indication information indicates the first partial instruction).

In this case, if the first information, the second information and the exclusive-OR operation are expressed by $1, $2 and exor respectively, the first storing portion stores $\{$1$ exor ($1 exor $2)$\}$=$2.

In the processing performed based on the second partial instruction of the SWAP instruction (when the instruction information indicates the second exclusive-OR operation and the SWAP indication information indicates the second partial instruction), the instruction executing portion outputs, to the data writing portion on the next stage, the instruction execution operation result obtained by executing the exclusive-OR operation of the data on the first and second buses, and the data writing portion exactly stores the instruction execution operation result in the second storing portion.

When the instruction executing portion executes the exclusive-OR operation, the data on the second bus is the second information and the data on the first bus is changed to ($1 exor $2) which is obtained by executing the exclusive-OR operation of the first and second information in the operation processing of the instruction executing portion performed based on the first partial instruction of the SWAP instruction.

Accordingly, the instruction execution operation result to be output by the instruction executing portion in the processing performed based on the second partial instruction of the SWAP instruction is $\{$2$ exor ($1 exor $2)$\}$=$1. The data writing portion stores $1 in the second storing portion.

Consequently, the computer according to the first aspect of the present invention can execute the SWAP instruction by two partial instructions. Thus, the SWAP instruction can be processed at a high speed. In this case, the operation processing to be performed by the instruction executing portion is an exclusive-OR operation processing according to the prior art. For this reason, the time for the operation processing performed by the ALU of the instruction executing portion or the like is not increased and the circuit structure is not complicated.

As a result, the computer according to the first aspect of the present invention can perform the SWAP processing at a high speed by adding a comparatively simple circuit structure without increasing the time for the operation processing of the instruction executing portion. According to the second aspect of the present invention, the instruction executing portion outputs, to the first bus, the instruction execution operation result obtained by executing the exclusive-OR operation of the first and second information on the first and second buses, and data writing portion stores the second information stored in the bus data storing portion as write data in the first storing portion in the processing performed based on the first partial instruction of the SWAP instruction (when the instruction information indicates the first exclusive-OR operation and the SWAP indication information indicates the first partial instruction).

In this case, if the first information, the second information and the exclusive-OR operation are expressed by $1, $2 and exor respectively, the first storing portion stores $2.

In the processing performed based on the second partial instruction of the SWAP instruction (when the instruction information indicates the second exclusive-OR operation and the SWAP indication information indicates the second partial instruction), the instruction executing portion outputs, to the data writing portion on the next stage, the instruction execution operation result obtained by executing the exclusive-OR operation of the data on the first and second buses, and the data writing portion exactly stores the instruction execution operation result in the second storing portion. When the instruction executing portion executes the exclusive-OR operation, the data on the second bus is the second information and the data on the first bus is changed to ($1 exor $2) which is obtained by executing the exclusive-OR operation of the first and second information in the operation processing of the instruction executing portion performed based on the first partial instruction of the SWAP instruction.

Accordingly, the instruction execution operation result to be output by the instruction executing portion in the processing performed based on the second partial instruction of the SWAP instruction is $\{$2$ exor ($1 exor $2)$\}$=$1. The data writing portion stores $1 in the second storing portion.

Consequently, the computer according to the second aspect of the present invention can execute the SWAP instruction by two partial instructions. Thus, the SWAP instruction can be processed at a high speed. In this case, the operation processing to be performed by the instruction executing portion is an exclusive-OR operation processing according to the prior art. For this reason, the time for the operation processing performed by the ALU of the instruction executing portion or the like is not increased and the circuit structure is not complicated.

As a result, the computer according to the second aspect of the present invention can perform the SWAP processing at a high speed by adding a comparatively simple circuit structure without increasing the time for the operation processing of the instruction executing portion. In addition, the data writing portion does not need the function of executing the exclusive-OR operation. Consequently, the circuit structure can be simplified more.

According to the third aspect of the present invention, when the instruction information indicates the second exclusive-OR operation processing, the instruction executing portion stores the data on the second bus in the bus data storing portion. Consequently, the data on the second bus can be retained by only adding the bus data storing portion irrespective of the contents of the operation processing of the instruction executing portion.

According to the fourth aspect of the present invention, the instruction executing portion causes the selecting means to store the data on the second bus in the addition result storing portion when the SWAP indication information indicates the first partial instruction, and the data writing portion fetches the data on the second bus from the addition result storing portion when the SWAP indication information indicates the first partial instruction. In the case where the instruction executing portion is provided with the adding portion, the addition result storing portion is used with the data storing portion. Consequently, the data on the second bus can be retained without another data storing portion provided.

According to the fifth aspect of the present invention, the instruction executing portion causes the adding portion to execute addition of "0" and the data on the second bus, and stores the result of addition in the addition result storing portion when the SWAP indication information indicates the first partial instruction, and the data writing portion fetches the data on the second bus from the addition result storing portion when the SWAP indication information indicates the first partial instruction. In the case where the instruction executing portion is provided with the adding portion, the addition result storing portion is used with the data storing portion. Consequently, the data on the second bus can be retained without another data storing portion provided. In addition, a component which corresponds to the selecting means of the computer according to the fourth aspect of the present invention is not necessary. Thus, the circuit structure can be simplified.

According to the sixth aspect of the present invention, the first and second data storing portions include the first and second registers. Consequently, the processing of exchanging the information stored in the first and second registers can be performed.

According to the seventh aspect of the present invention, the first and second data storing portions include the first and second storing areas of the external memory. Consequently, the processing of exchanging the information stored in the two storing areas on the external memory can be performed.

According to the eighth aspect of the present invention, the complier generates, as an object code for an instruction that indicates the SWAP instruction in the source code, a first partial instruction which indicates to execute the exclusive-OR of the first and second information stored in the first and second storing portions so as to obtain a first operation result when performing the operation processing, and indicates to write the same information having the same value as that of the second information to the first storing portion when performing the data writing processing, and a second partial instruction which is executed subsequently to the first partial instruction and indicates to execute the exclusive-OR operation of the second information and the first operation result so as to obtain a second operation result when performing the operation processing and to write the second operation result to the second storing portion when performing the data writing processing.

In this case, it is assumed that the first information, the second information and the exclusive-OR operation are expressed by $1, $2 and exor. When the computer which can perform the pipeline processing executes the first and second partial instructions, the first storing portion stores {$1 exor ($1 exor $2)}=$2 and the second storing portion stores {$1 exor ($1 exor $2)}=$1.

As a result, it is possible to obtain the compiler capable of outputting two partial instructions which can execute the SWAP instruction.

According to the ninth aspect of the present invention, the same information having the same value as that of the second information is the operation result data obtained by the exclusive-OR of the first information and the first operation result. The operation result data is {$1 exor ($1 exor $2)}=$2, and can accurately have the same value as that of the second information.

According to the tenth aspect of the present invention, the same information having the same value as that of the second information includes the second information itself. Consequently, it is possible to accurately have the same value as that of the second information without special operation processings.

In order to solve the above-mentioned problems, it is an object of the present invention to provide a computer of a pipeline type which can perform a processing of exchanging data stored in two data storing portions at a high speed by adding a comparatively simple circuit structure without increasing the time for an operation processing of an instruction executing portion such as an ALU or the like.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a diagram showing an object code obtained after the execution of a compiler according to a second embodiment of the present invention;

FIG. 7 is a diagram showing the contents of an operation of the computer according to the second embodiment of the present invention;

FIG. 10 is a block diagram showing the structure of a computer according to a fifth embodiment of the present invention;

DESCRIPTION OF THE PREFERRED EMBODIMENTS

<First Embodiment>

Figure 1:
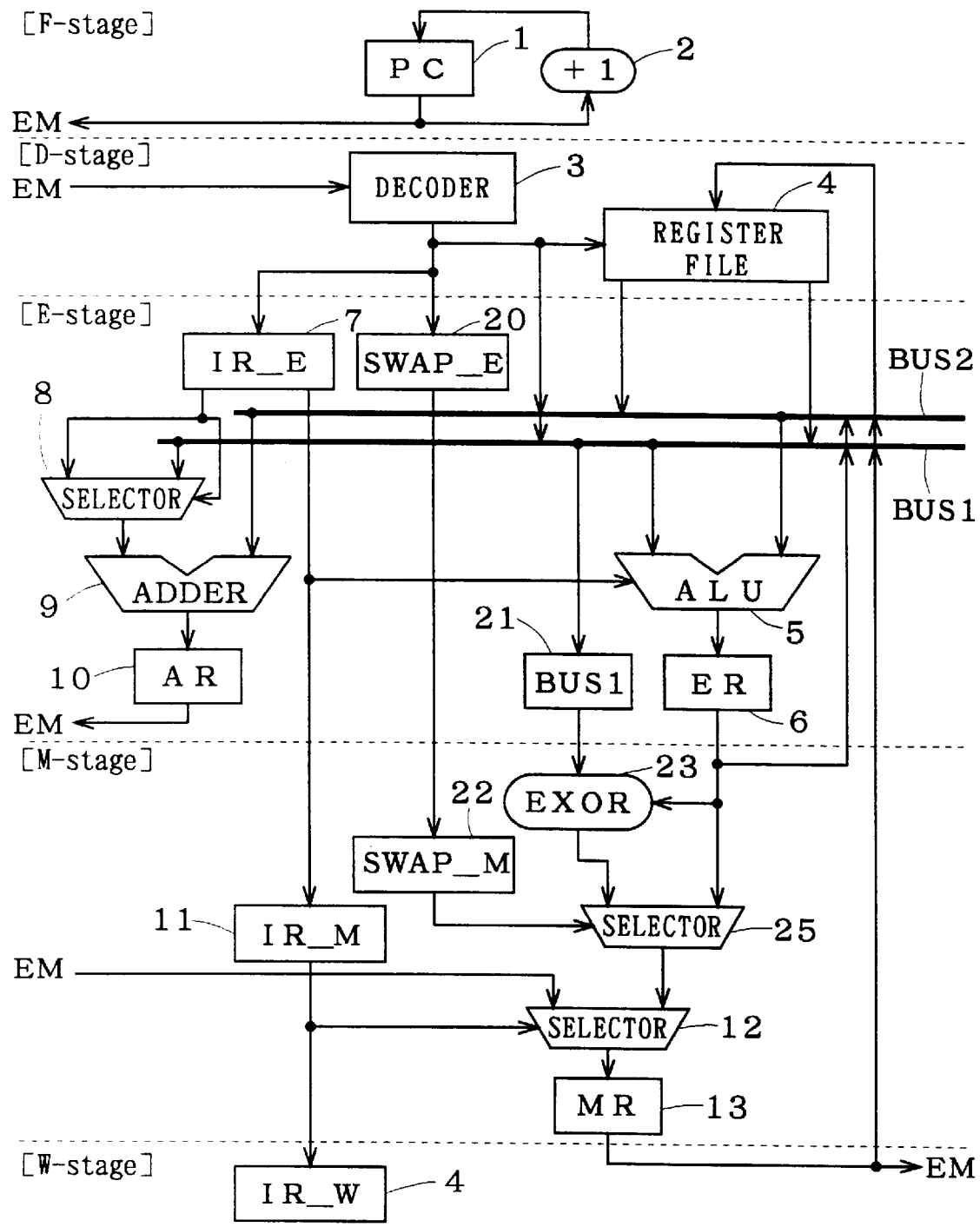
FIG. 1 is a block diagram showing the structure of a computer according to a first embodiment of the present invention.
Figures 2, 3, 4:
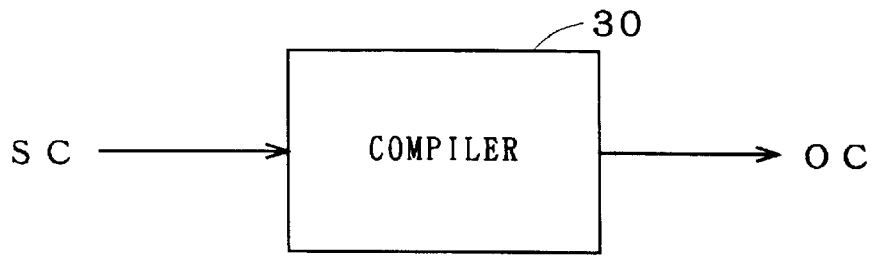
FIG. 2 is a block diagram showing the structure of a compiler according to the first embodiment of the present invention.
FIG. 3 is a diagram showing an object code obtained after the execution of the complier according to the first embodiment of the present invention.
FIG. 4 is a diagram showing the contents of an operation of the computer according to the first embodiment of the present invention.

FIG. 1 is a block diagram showing the structure of a computer of a pipeline type according to a first embodiment of the present invention. FIG. 2 is a diagram showing the structure of a compiler for generating an object code which is given to the computer shown in FIG. 1.

As shown in FIG. 2, a compiler 30 receives a source code SC and generates an object code OC which can be executed by the computer shown in FIG. 1. In the case where the source code SC includes a SWAP instruction which indicates a processing of exchanging data stored in two data storing portions, an object code OC comprising two partial instructions CM1 and CM2 shown in FIG. 3 is generated.

In FIG. 3, swapex and exor instructions indicate the execution of an exclusive-OR operation. In general, an ALU 5 of the computer always has the exor instructions. The swapex instruction is an instruction for the object code OC which is newly set according to the present invention. Similarly to the exor instruction, the swapex instruction executes exclusive-OR in the ALU 5. Accordingly, a new function is not necessary for the ALU 5 of the computer according to the prior art by adding the swapex instruction.

As shown in FIG. 1, a program counter 1 and an incrementer 2 are provided as components for the F-stage processing. At the F-stage, an instruction is fetched from an external memory EM and stored in a predetermined area of the external memory EM according to the value of the program counter 1. Every time a processing for a unit stage is completed, the incrementer 2 increases the value of the program counter 1 by 1 so that the next instruction is fetched.

A decoder 3 and a register file 4 are provided as components for the D-stage processing. At the D-stage, the fetched instruction is decoded by the decoder 3 and the contents of the processing are decided to issue instruction information thereof. Every time the processing is completed, the instruction information is transferred to an instruction register 7 on the next stage, that is, the E-stage. Thus, a processing necessary for the E-stage is performed. In the case where the swapex instruction is decoded by the decoder 3, the instruction information for designating the exor instruction is given to the instruction register 7 and "1" is output as SWAP indication information to a register 20 for SWAP instructions on the E-stage. In the case where instructions other than the swapex instruction are decoded by the decoder 3, "0" is output as SWAP indication information to the register 20 for SWAP instructions.

Furthermore, the decoder 3 reads out the necessary data from the register file 4 onto buses BUS1 and BUS2 simultaneously with instruction decoding described above. At this time, at most two data are read out from the register file 4.

An ALU 5, an operation result register 6, an instruction register 7, a selector 8, an adder 9, an addition result register 10, a register 20 for SWAP instructions, and a bus register 21 are provided as components for the E-stage processing.

At the E-stage, an operation processing is performed for the data read out on the buses BUS1 and BUS2 by using the ALU 5. The ALU 5 performs the processing according to the indication of instruction information stored in the instruction register 7. In the processing at the E-stage, some instructions calculate addresses of data read out from the external memory EM (the addresses of data to be written to the external memory EM). The address calculation is executed by using the special purpose adder 9. The adder 9 also decides a processing according to the indication of the instruction information stored in the instruction register 7. The operation result register 6 stores the result of an operation obtained by the ALU 5. The addition result register 10 stores the result of addition obtained by the adder 9. The data stored in the operation result register 6 is transferred as the ALU operation result of the E-stage to the M-stage.

A part of data stored in the instruction register 7 are given as control data to a selector 8. Another part of data are given as input data to the selector 8. The selector 8 receives data on the bus BUS1 and another part of data stored in the instruction register 7, and outputs one of them to one of inputs of the adder 9.

The register 20 for SWAP instructions store SWAP indication information, and functions as a register for designating that an instruction present at the E-stage is a swapex instruction or not. More specifically, the register 20 for SWAP instructions indicates that the instruction present at the E-stage is the swapex instruction if the data stored in the register 20 for SWAP instructions are "1". The register 20 for SWAP instructions indicates that the instruction present at the E-stage is another instruction if the data stored in the register 20 for SWAP instructions are "0". The bus register 21 stores the data of the bus BUS1 input to the ALU 5 independently of the ALU 5. In case of the instruction CM1 shown in FIG. 3, the data of a register $1 are read onto the bus BUS1. Consequently, the data of the register $1 are stored in the bus register 21. The SWAP indication information stored in the register 20 for SWAP instructions is exactly transferred to a register 22 for SWAP instructions on the stage-M.

An instruction register 11, a selector 12, an output result register 13, a register 22 for SWAP instructions, an exclusive-OR gate 23 and a selector 25 are provided as components for the M-stage processing.

The exclusive-OR gate 23 is a circuit which specially executes an exclusive-OR operation. The exclusive-OR gate 23 executes the exclusive-OR of the ordinary operation result (ALU operation result) on the E-stage which is stored in the operation result register 6 and data stored in the bus register 21 so that the EXOR operation result is output to the selector 25.

The selector 25 outputs, to the selector 12, one of the EXOR operation result and the ALU operation result stored in the operation result resister 6 based on the SWAP indication information stored in the register 22 for SWAP instructions. If the SWAP indication information stored in the register 22 for SWAP instructions is "0", the ALU operation result is selected. If the SWAP indication information stored in the register 22 for SWAP instructions is "1", the EXOR operation result is selected.

Based on the instruction information stored in the instruction register 11, the selector 12 selects one of the data output from the selector 25 and the data read out from the external memory EM and outputs the same data to the output result register 13. In the case where the instruction information indicates instructions other than the instruction to read out data from the external memory EM, the selector 12 sends the output of the selector 25 to the output result register 13.

The data stored in the output result register 13 is transferred as the output result of the M-stage to the W-stage. At the W-stage, the output result stored in the output result register 13 is written to the register file 4. Only one data is usually written to the register file 4.

With such a structure, in the case where instruction strings which are not related to the instructions CM1 and CM2 are processed by the computer according to the first embodiment, the registers 20 and 22 for SWAP instructions are always "0". Consequently, the computer according to the first embodiment operates equivalently to the computer according to the prior art so as to process programs. If a SWAP processing should be performed by the source code SC in the program, the compiler 30 creates an object code OC comprising instruction strings (CM1, CM2) shown in FIG. 3 so that the computer performs the processing based on the object code OC.

The features of the processing operation of the instructions CM1 and CM2 performed by the computer according to the first embodiment will be mainly described below.

Figure 11:
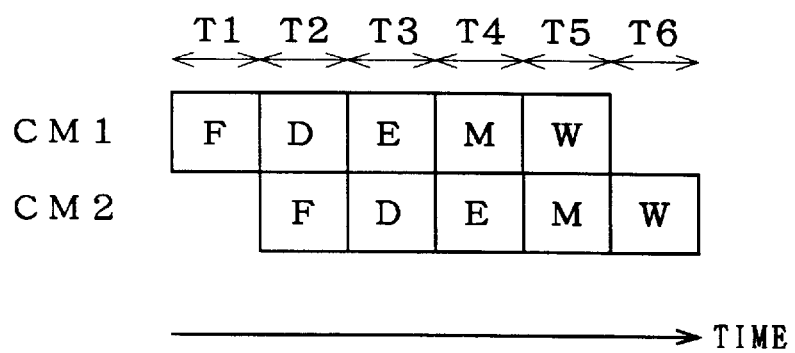
FIG. 11 is a diagram for explaining the operation of the computers according to the first to fifth embodiments of the present invention.
Figure 12:
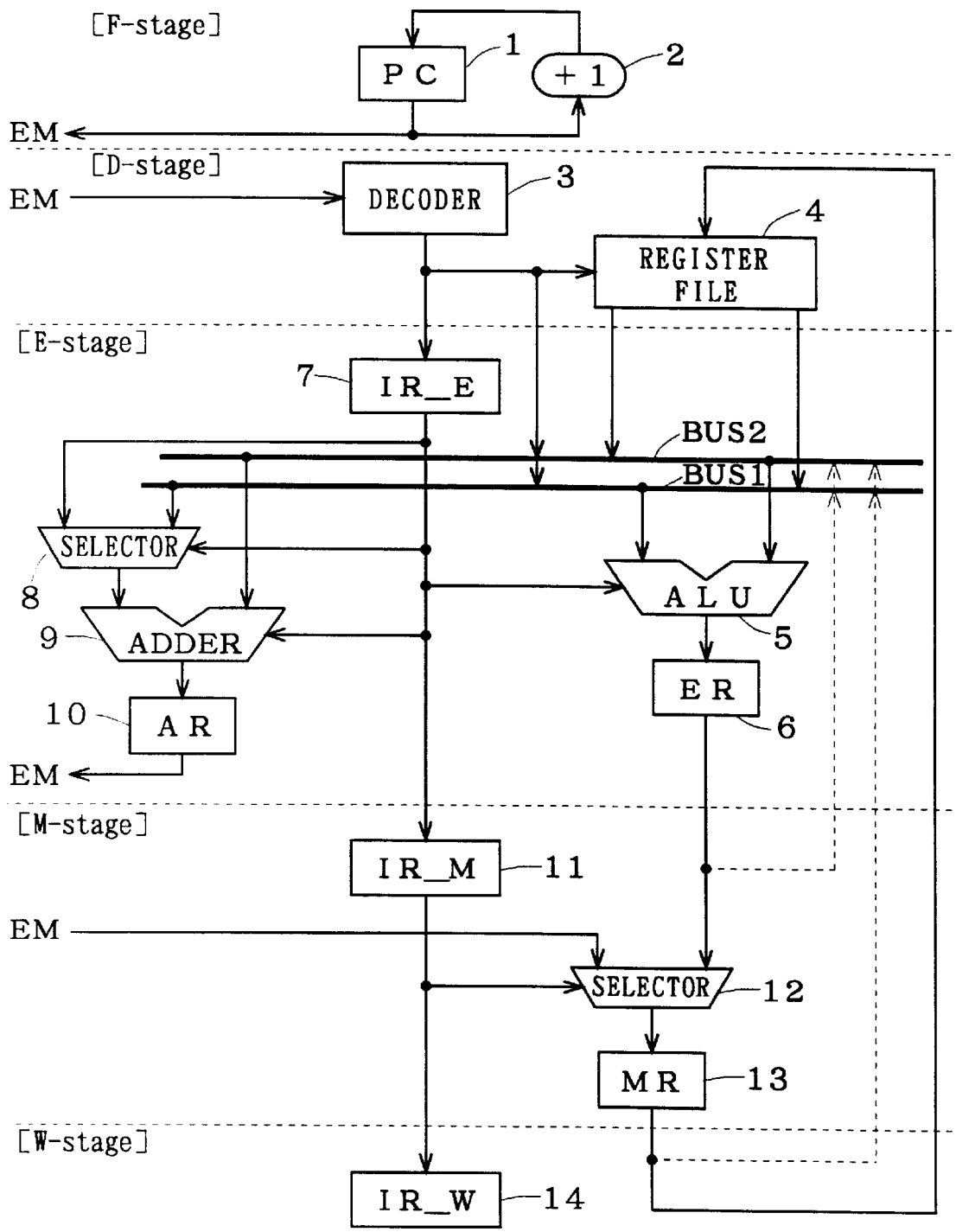
FIG. 12 is a block diagram showing the structure of a computer according to the prior art.
Figures 13, 14, 15:
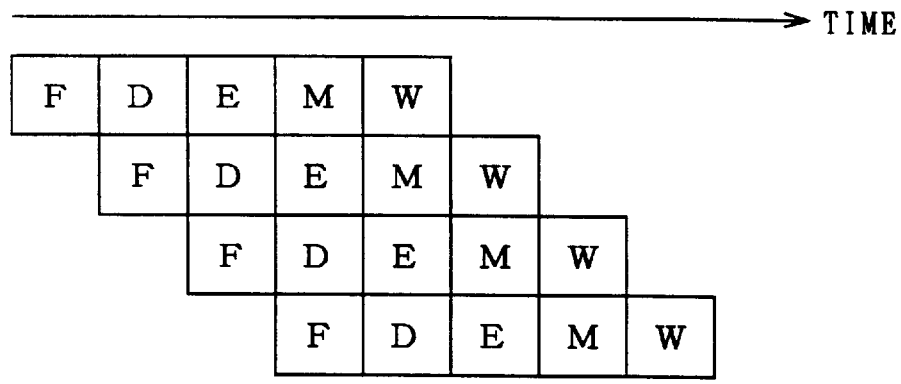
FIG. 13 is a diagram showing the contents of a pipeline processing.
FIG. 14 is a diagram showing an example of an operation of the computer according to the prior art.
FIG. 15 is a diagram showing the contents of an operation of a SWAP processing performed by the computer according to the prior art.

First of all, the case where the swapex instruction of the instruction CM1 is executed at the E-stage as shown in a cycle T3 of FIG. 11 will be considered. In this case, the swapex instruction is being executed. For this reason, "1" is stored as SWAP indication information in the register 20 for SWAP instructions on the E-stage. However, an operation processing is performed irrespective of the SWAP indication information of the register 22 for SWAP instructions at the E-stage. Consequently, the computer according to the first embodiment operates in the same manner as the computer according to the prior art.

Accordingly, the ALU 5 executes the exclusive-OR of first information stored in the register $1 and second information stored in the register $2 so that the ALU operation result is stored in the operation result register 6. The first information of the register $1 is stored in the bus register 21 and transferred to the exclusive-OR gate 23 on the stage next to the E-stage, that is, the M-stage. The ALU operation result stored in the operation result register 6 is output to the selector 25 and transferred onto the bus BUS1 through a bypass path.

For convenience of explanation, the first and second information which are originally stored in the registers $1 and $2, the ALU operation result of the instruction CM1 obtained at the E-stage are expressed by "$1", "$2" and "$1'" in some cases. In this respect, the following embodiments are the same as the present embodiment.

In a cycle T4 next to the cycle T3, the exor instruction of the instruction CM2 is executed at the E-stage. In this case, "0" is stored as SWAP indication information in the register 20 for SWAP instructions at the E-stage.

Simultaneously with this operation, the swapex instruction of the instruction CM1 is executed at the M-stage. At this time, "1" is stored as SWAP indication information in the register 22 for SWAP instructions. Accordingly, the selector 25 selects the EXOR operation result ($1 exor $1') of the first information stored in the bus register 21 and the ALU operation result $1' (the exclusive-OR of the first and second information). The selected operation result ($1 exor $1') is output to the output result register 13 through the selector 12. The output result stored in the output result register 13 is output to the register $1 of the register file 4 at the W-stage in a cycle T5. The value of the output result is equal to the second information ($2) stored in the register $2 as shown by the instruction CM1 of FIG. 4.

The instruction CM2 which is executed at the E-stage in the cycle T4 performs the operation equivalent to that of the computer according to the prior art irrespective of the SWAP indication information of the register 20 for SWAP instructions. More specifically, the instruction CM2 is the exor instruction. Consequently, the ALU 5 executes the exclusive-OR operation of data on the buses BUS1 and BUS2 to obtain the ALU operation result.

In this case, the bypass operation is performed at the E-stage in the same manner as in the computer according to the prior art. More specifically, an output object of the E-stage (instruction CM1) in the cycle T3 is the register $1. In the cycle 4, therefore, the ALU 5 does not utilize the value $1 of the register $1 of the register file 4 but the value $1' output at the E-stage in the cycle T3 through the bus BUS1. In other words, $1' is used as $1 of the instruction CM2.

As a result, the exclusive-OR operation of $1' ($1 exor $2) and $2 is executed at the E-stage in the cycle T4. The obtained result is output as the ALU operation result to the operation result register 6. At this time, the ALU operation result is equal to the first information ($1) stored in the register $1 as shown by the instruction CM2 in FIG. 4.

In the cycle T5 next to the cycle T4, the swapex instruction of the instruction CM1 is executed at the W-stage and the output result $2 is written to the register $1 of the register file 4. The instruction CM2 is processed at the M-stage. Since the SWAP indication information of the register 22 for SWAP instructions is "0", the ALU operation result stored in the operation result register 6 at the E-stage in the cycle T4 is exactly transferred as the output result to the output result register 13 through the selectors 25 and 12. The output result is data which should be output to the register $2 of the register file 4 at the W-stage.

In a cycle T6, the exor instruction of the instruction CM2 is executed at the W-stage, and the output result $1 stored in the output result register 13 is written to the register $2 of the register file 4.

As described above, the operation of the computer according to the first embodiment performs the operation processing expressed by an equation shown in FIG. 4. As a result, the second information ($2) of the register $2 is written to the register $1 when the swapex instruction of the instruction CM1 is completed at the W-stage, and the first information ($1) of the register $1 is written to the register $2 when the exor instruction of the instruction CM2 is completed at the W-stage. In other words, a processing of exchanging the first information ($1) stored in the register $1 for the second information ($2) stored in the register $2, that is, the SWAP processing can be completed by the object code OC comprising two instructions.

Thus, the computer according to the first embodiment can perform the SWAP operation by two instructions unlike the computer according to the prior art in which three instructions are necessary for the object code OC. Accordingly, the computer of a pipeline type according to the first embodiment can perform the SWAP processing more quickly than the computer of a pipeline type according to the prior art. Furthermore, three registers, an EXOR gate and a selector are added as circuits for processing the swapex instruction.

Figure 16:
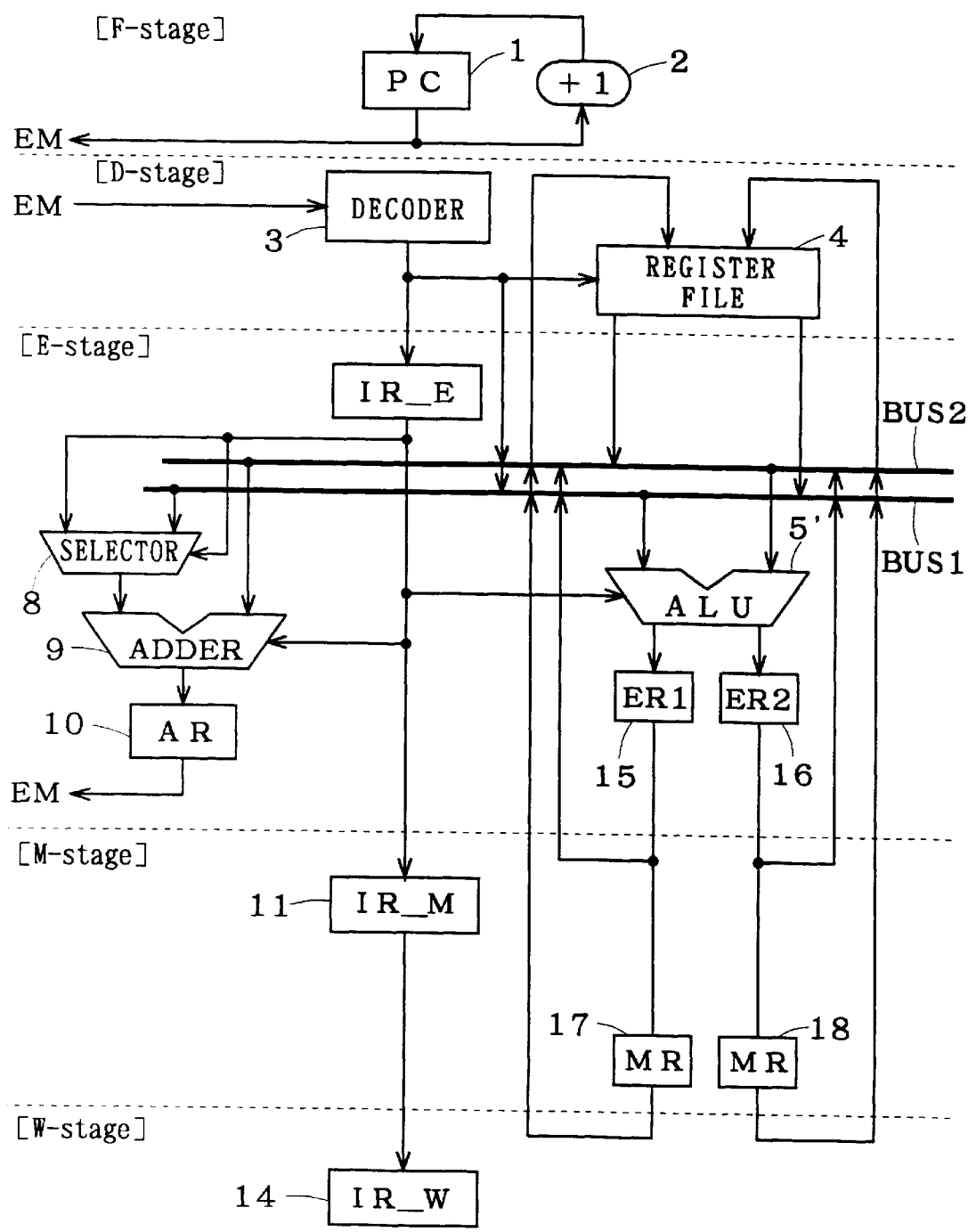
FIG. 16 is a block diagram showing the structure of a 4-operand instruction system computer according to the prior art.

In particular, the ALU 5 which decides the processing time for a cycle is not changed. Consequently, the processing time for each cycle is not increased. With the structure of FIG. 16, a plurality of outputs do not exist at each stage. Consequently, it is not necessary to add circuits for bypass. In addition, a quantity of hardware is hardly increased.

As a result, the computer according to the first embodiment can perform the SWAP processing at a high speed by adding a comparatively simple circuit structure without increasing the processing time of the ALU.

<Second Embodiment>

Figure 5:
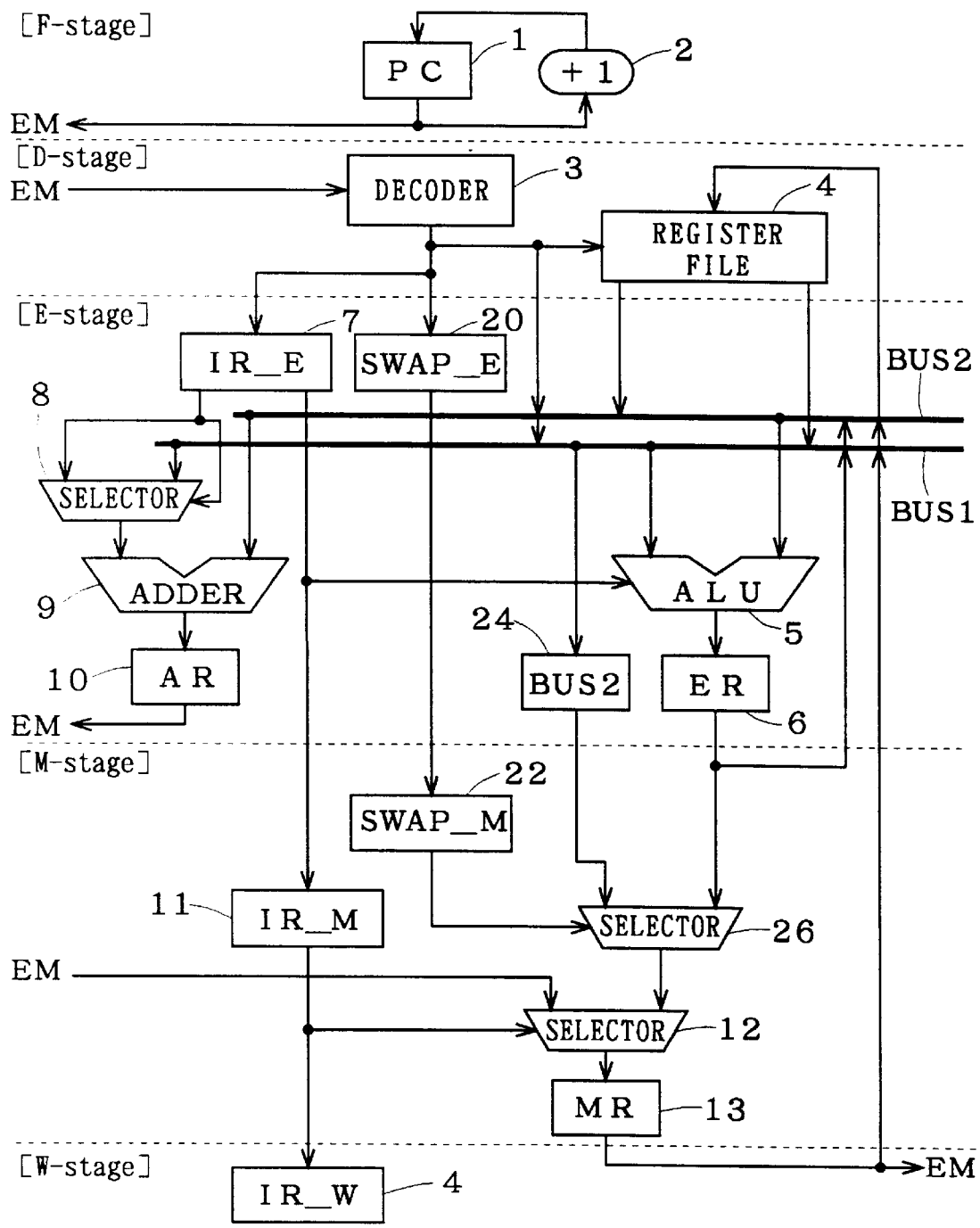
FIG. 5 is a block diagram showing the structure of a computer according to a second embodiment of the present invention.

FIG. 5 is a block diagram showing the structure of a computer of a pipeline type according to a second embodiment of the present invention. The structure of a complier is the same as in the first embodiment shown in FIG. 2.

As shown in FIG. 2, a compiler 30 receives a source code SC and generates an object code OC which can be executed by the computer shown in FIG. 1. In the case where the source code SC includes a SWAP instruction which indicates a processing of exchanging data stored in two data storing portions, an object code OC comprising two partial instructions CM1 and CM2 shown in FIG. 3 is generated. Accordingly, it is not necessary to add a new function to the ALU 5 of the computer according to the prior art by adding a swapex instruction in the same manner as in the first embodiment.

The difference in structure between the computers according to the first and second embodiments will be mainly described below. As shown in FIG. 5, the components of the F- and D-stages are the same as in the first embodiment. A ALU 5, an operation result register 6, an instruction register 7, a selector 8, an adder 9, an addition result register 10, a register 20 for SWAP instructions, and a bus register 24 are provided as components for the E-stage processing. In other words, the bus register 24 is provided in place of the bus register 21 according to the first embodiment.

The bus register 24 stores the data of a bus BUS2 input to the ALU 5 independently of the ALU 5. In case of the instruction CM1 shown in FIG. 3, the data of the register $2 is read on the bus BUS2 so that it is stored in the bus register 24. Other structures of the F-stage are the same as in the first embodiment.

An instruction register 11, a selector 12, an output result register 13, a register 22 for SWAP instructions, and a selector 26 are provided as components for the M-stage processing. In other words, the exclusive-OR gate 23 according to the first embodiment is removed and the selector 26 is provided in place of the selector 25 according to the first embodiment.

The selector 26 outputs, to the selector 12, one of the data stored in the bus register 24 and the ALU operation result stored in the operation result resister 6 based on the SWAP indication information stored in the register 22 for SWAP instructions. If the SWAP indication information stored in the register 22 for SWAP instructions is "0", the ALU operation result is selected. If the SWAP indication information stored in the register 22 for SWAP instructions is "1", the read-out data of the bus BUS2 which is stored in the bus register 24 is selected. Other structures of the M-stage are the same as in the first embodiment.

The difference in operation between the computers according to the first and second embodiments will be mainly described below.

First of all, the operation to be performed until a cycle T3 shown in FIG. 11 is the same as in the first embodiment. The second information of a register $2 is stored in the bus register 24 and transferred to the selector 26 on the stage next to the E-stage, that is, the M-stage.

In a cycle T4 next to the cycle T3, the exor instruction of the instruction CM2 is executed at the E-stage. In this case, "0" is stored as SWAP indication information in the register 20 for SWAP instructions on the E-stage.

Simultaneously with this operation, the swapex instruction of the instruction CM1 is executed at the M-stage. In this case, "1" is stored as SWAP indication information of the register 22 for SWAP instructions. Accordingly, the selector 26 selects data ($2) stored in the bus register 24. The selected data ($2) is output to the output result register 13 through the selector 12. The output result stored in the output result register 13 is output to the register $1 of the register file 4 at the W-stage in a cycle T5. The value of the output result is the second information ($2) itself stored in the register $2 as shown by the instruction CM1 of FIG. 7.

The instruction CM2 which is executed at the E-stage in the cycle T4 performs the operation equivalent to that of the computer according to the prior art irrespective of the SWAP indication information of the register 20 for SWAP instructions. More specifically, the instruction CM2 is the exor instruction. Consequently, the ALU 5 executes the exclusive-OR operation of data on the buses BUS1 and BUS2 to obtain the ALU operation result.

In this case, the bypass operation is performed at the E-stage in the same manner as in the computer according to the prior art. More specifically, an output object of the E-stage (instruction CM1) in the cycle T3 is the register $1. In the cycle T4, therefore, the ALU 5 does not utilize the value $1 of the register $1 of the register file 4 but the value $1' output at the E-stage in the cycle T3 through the bus BUS1. In other words, $1' is used as $1 of the instruction CM2.

As a result, the exclusive-OR operation of $1' ($1 exor $2) and $2 is executed at the E-stage in the cycle T4. The obtained result is output as the ALU operation result to the operation result register 6. At this time, the ALU operation result is equal to the first information ($1) stored in the register $1 as shown by the instruction CM2 in FIG. 7.

In the cycle T5 next to the cycle T4, the swapex instruction of the instruction CM1 is executed at the W-stage and the output result $2 is written to the register $1 of the register file 4. The instruction CM2 is processed at the M-stage. Since the SWAP indication information of the register 22 for SWAP instructions is "0", the ALU operation result stored in the operation result register 6 at the E-stage in the cycle T4 is exactly transferred as the output result to the output result register 13 through the selectors 26 and 12. The output result is data which should be output to the register $2 of the register file 4 at the W-stage.

In a cycle T6, the exor instruction of the instruction CM2 is executed at the W-stage, and the output result $1 stored in the output result register 13 is written to the register $2 of the register file 4.

As described above, the computer according to the second embodiment performs the operation processing expressed by an equation shown in FIG. 7. As a result, the second information ($2) of the register $2 is written to the register $1 when the swapex instruction of the instruction CM1 is completed at the W-stage, and the first information ($1) of the register $1 is written to the register $2 when the exor instruction of the instruction CM2 is completed at the W-stage. In other words, a processing of exchanging the first information ($1) stored in the register $1 for the second information ($2) stored in the register $2, that is, the SWAP processing can be completed by the object code OC comprising two instructions.

Thus, the computer according to the second embodiment can perform the SWAP operation by two instructions in the same manner as in the first embodiment. Consequently, the computer according to the second embodiment can perform the SWAP processing more quickly than the computer of a pipeline type according to the prior art. In addition, three registers and a selector are added as circuits for processing the swapex instruction.

As a result, the computer according to the second embodiment can perform the SWAP processing at a high speed by adding a comparatively simple circuit structure without increasing the processing time of the ALU in the same manner as in the first embodiment.

With the structure of the computer according to the second embodiment, furthermore, the EXOR gate is not necessary. Consequently, a circuit structure can be simplified more than in the first embodiment.

<Third Embodiment>

Figure 8:
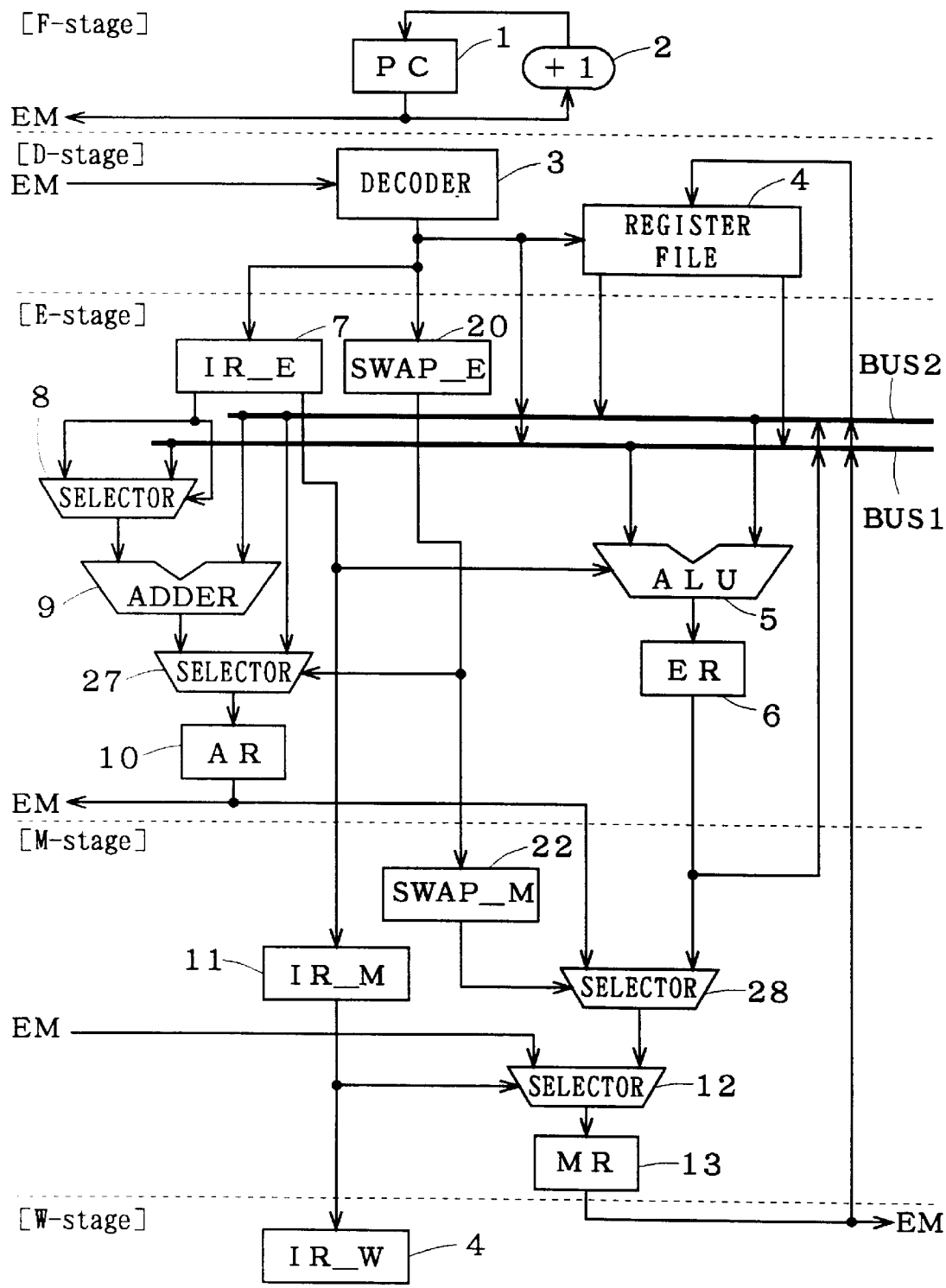
FIG. 8 is a block diagram showing the structure of a computer according to a third embodiment of the present invention.

FIG. 8 is a block diagram showing the structure of a computer of a pipeline type according to a third embodiment of the present invention. The structure and operation of a complier are the same as in the first embodiment shown in FIG. 2.

The difference in structure between the computers according to the second and third embodiments will be mainly described below. As shown in FIG. 8, the components of the F- and D-stages are the same as in the second embodiment.

An ALU 5, an operation result register 6, an instruction register 7, a selector 8, an adder 9, an addition result register 10, a register 20 for SWAP instructions, and a selector 27 are provided as components for the E-stage processing. In other words, the addition result register 10 is substituted for the bus register 24 according to the second embodiment. A selector 27 is provided to control the addition result register 10.

The selector 27 receives the addition result of the adder 9 and data on a bus BUS2, and selects one of the addition result of the adder 9 and the data on the bus BUS2 and outputs the same data to the adder result register 10 based on SWAP indication information stored in the register 20 for SWAP instructions. When the SWAP indication information of the register 20 for SWAP instructions is "1", the selector 27 outputs the data on the bus BUS2 to the addition result register 10. When the SWAP indication information is "0", the selector 27 outputs the addition result of the adder 9 to the addition result register 10. Other structures of the E-stage are the same as in the first embodiment.

An instruction register 11, a selector 12, an output result register 13, a register 22 for SWAP instructions, and a selector 28 are provided as components for the M-stage processing. In other words, the selector 28 is provided in place of the selector 26 according to the second embodiment.

The selector 28 outputs, to the selector 12, one of the data stored in the addition result register 10 and the ALU operation result stored in the operation result register 6 based on the SWAP indication information stored in the register 22 for SWAP instructions. If the SWAP indication information stored in the register 22 for SWAP instructions is "0", the ALU operation result is selected. If the SWAP indication information stored in the register 22 for SWAP instructions is "1", the read-out data of the bus BUS2 which is stored in the addition result register 10 is selected. Other structures of the M-stage are the same as in the second embodiment.

The difference in operation between the computers according to the second and third embodiments will be mainly described below.

First of all, the operation to be performed until a cycle T3 shown in FIG. 11 is the same as in the second embodiment. Since the SWAP indication information stored in the register 20 for SWAP instruction is "1", the selector 27 selects the second information of a register $2 on the bus BUS2 to output the same second information to the addition result register 10. The data stored in the addition result register 10 is transferred to the selector 28 on the stage next to the E-stage, that is, the M-stage.

In a cycle T4 next to the cycle T3, the exor instruction of the instruction CM2 is executed at the E-stage. In this case, "0" is stored as SWAP indication information in the register 20 for SWAP instructions on the E-stage.

Simultaneously with this operation, the swapex instruction of the instruction CM1 is executed at the M-stage. In this case, "1" is stored as SWAP indication information of the register 22 for SWAP instructions. Accordingly, the selector 28 selects data ($2) stored in the addition result register 10. The selected data ($2) is output to the output result register 13 through the selector 12. The output result stored in the output result register 13 is output to the register $1 of the register file 4 at the W-stage in a cycle T5. The value of the output result is the second information ($2) itself stored in the register $2 as shown by the instruction CM1 of FIG. 7. Another operation in the cycle T4 is the same as in the second embodiment.

In the cycle T5 next to the cycle T4, the swapex instruction of the instruction CM1 is executed at the W-stage and the output result $2 is written to the register $1 of the register file 4. The instruction CM2 is processed at the M-stage. Since the SWAP indication information of the register 22 for SWAP instructions is "0", the ALU operation result stored in the operation result register 6 at the E-stage in the cycle T4 is transferred as the output result to the output result register 13 through the selectors 28 and 12. The output result is data which should be output to the register $2 of the register file 4 at the W-stage. The following operation is the same as in the second embodiment.

As described above, the computer according to the third embodiment performs the operation processing expressed by the equation shown in FIG. 7 in the same manner as in the second embodiment. As a result, the second information ($2) of the register $2 is written to the register $1 when the swapex instruction of the instruction CM1 is completed at the W-stage, and the first information ($1) of the register $1 is written to the register $2 when the exor instruction of the instruction CM2 is completed at the W-stage. In other words, a processing of exchanging the first information ($1) stored in the register $1 for the second information ($2) stored in the register $2, that is, the SWAP processing can be completed by the object code OC comprising two instructions.

Thus, the computer according to the third embodiment can perform the SWAP operation by two instructions in the same manner as in the first and second embodiments. Consequently, the computer according to the third embodiment can perform the SWAP processing more quickly than the computer of a pipeline type according to the prior art. Furthermore, two registers and two selectors are added as circuits for processing the swapex instruction.

As a result, the computer according to the third embodiment can perform the SWAP processing at a high speed by adding a comparatively simple circuit structure without increasing the processing time of the ALU in the same manner as in the first and second embodiments.

In addition, the computer according to the third embodiment differs from the computer according to the second embodiment in that a register is replaced with a selector. In general, the circuit structure of the selector is simpler than that of the register. Consequently, the circuit structure of the third embodiment can be simplified more than that of the second embodiment.

<Fourth Embodiment>

Figure 9:
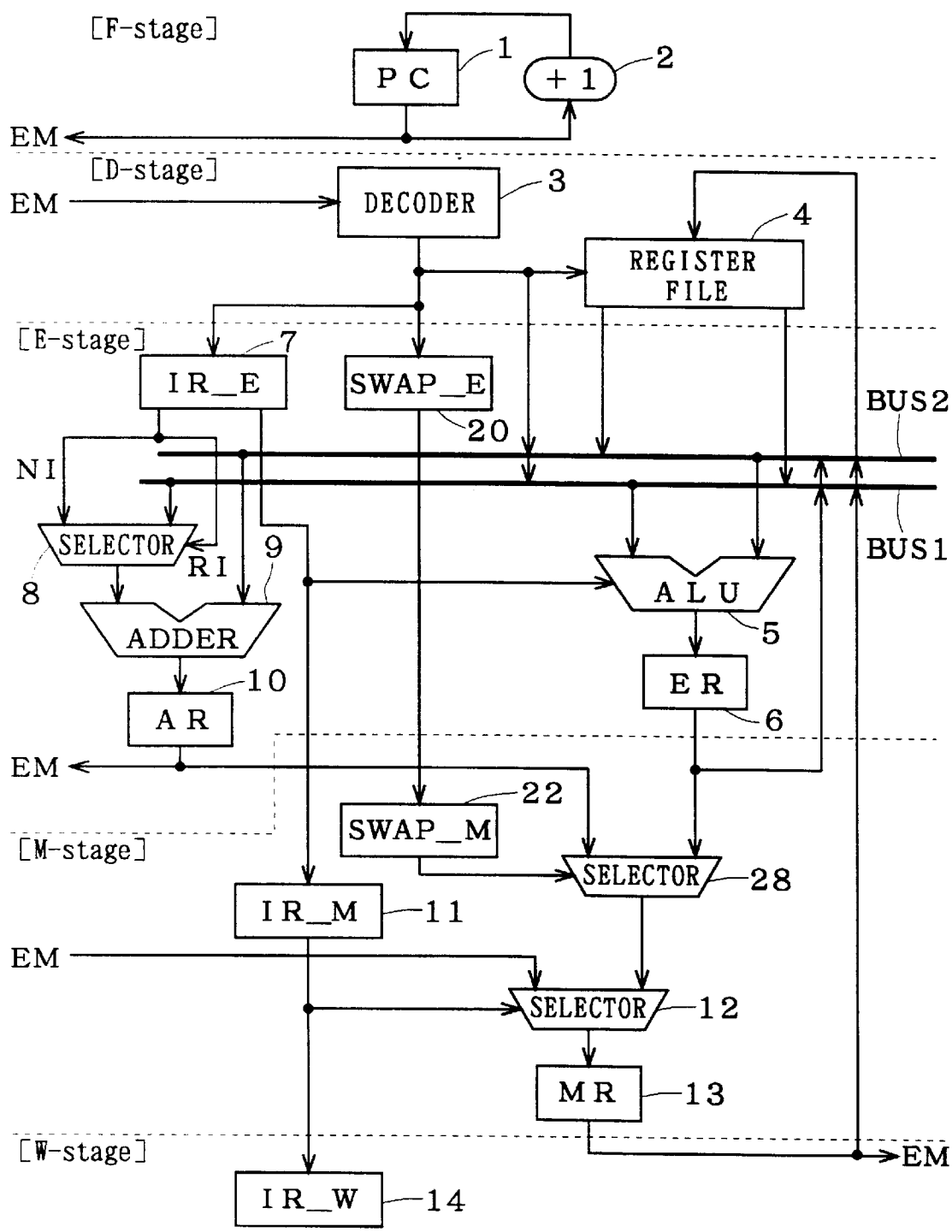
FIG. 9 is a block diagram showing the structure of a computer according to a fourth embodiment of the present invention.

FIG. 9 is a block diagram showing the structure of a computer of a pipeline type according to a fourth embodiment of the present invention. The structure and operation of a complier are the same as in the first embodiment shown in FIG. 2.

The difference in structure between the computers according to the third and fourth embodiments will be mainly described below.

As shown in FIG. 9, an ALU 5, an operation result register 6, an instruction register 7, a selector 8, an adder 9, an addition result register 10, and a register 20 for SWAP instructions are provided as components for the E-stage processing. In other words, the selector 27 according to the third embodiment is omitted.

The instruction information stored in the instruction register 7 generally includes actual instruction information RI which defines the actual contents of instructions and numerical information NI which defines numerical data. The actual instruction information RI is given to a control input of the selector 8, and the numerical information NI is given to the other input of the selector 8. If the instruction information of the instruction register 7 is an exor instruction, the actual instruction information RI which indicates the exor instruction and the numerical information NI which indicates "0" are output to the control input and the other input of the selector 8 respectively.

If the actual instruction information RI indicates the exor instruction, the selector 8 selects the numerical information NI which indicates "0" and outputs the numerical information NI to the adder 9. Other structures are the same as in the third embodiment.

The difference in operation between the computers according to the third and fourth embodiments will be mainly described below.

In a cycle T3 shown in FIG. 11, the actual instruction information RI stored in the instruction register 7 indicates the exor instruction and the numerical information NI indicates "0". For this reason, the selector 8 outputs "0" to one of inputs of the adder 9. At this time, second information ($2) of a register $2 on a bus BUS2 is sent to the other input of the adder 9. Consequently, the addition result of the adder 9 is also $2 to be stored in the addition result register 10. Another operation is the same as in the third embodiment.

As described above, the computer according to the fourth embodiment performs the operation processing expressed by an equation shown in FIG. 7 in the same manner as in the second and third embodiments. As a result, a processing of exchanging the first information ($1) stored in the register $1 for the second information ($2) stored in the register $2, that is, the SWAP processing can be completed by the object code OC comprising two instructions in the same manner as in the first to third embodiments.

Thus, the computer according to the fourth embodiment can perform the SWAP operation by two instructions in the same manner as in the first to third embodiments. Consequently, the computer according to the fourth embodiment can perform the SWAP processing more quickly than the computer of a pipeline type according to the prior art. Furthermore, two registers and a selector are added as circuits for processing the swapex instruction.

As a result, the computer according to the fourth embodiment can perform the SWAP processing at a high speed by adding a comparatively simple circuit structure without increasing the processing time of the ALU in the same manner as in the first to third embodiments.

Furthermore, the computer according to the fourth embodiment differs from the computer according to the third embodiment in that a selector is omitted. Consequently, the circuit structure of the fourth embodiment can be simplified more than that of the third embodiment.

<Fifth Embodiment>

FIG. 10 is a block diagram showing the structure of a computer of a pipeline type according to a fifth embodiment of the present invention. As shown in FIG. 10, information stored in storing areas EM1 and EM2 of an external memory EM are SWAP objects. In other words, the information stored in the storing areas EM1 and EM2 of the external memory EM are employed in place of information stored in two registers in a register file 4. Other structures are the same as in the first embodiment shown in FIG. 1.

The computer according to the fifth embodiment operates in the same manner as in the first embodiment, except that the external memory EM is used in place of the register file 4.

In the computer according to the fifth embodiment, a processing of exchanging the information stored in the storing areas of the external memory EM can also be performed at a high speed by adding a comparatively simple circuit structure without increasing the processing time of an ALU.

Also in the computers according to the second to fourth embodiments, it is apparent that the processing of exchanging the information stored in the storing areas of the external memory EM can be performed by changing a circuit in the same manner as in the first embodiment whose contents are changed according to the fifth embodiment.

While the invention has been described in detail, the foregoing description is in all aspects illustrative and not restrictive. It is understood that numerous other modifications and variations can be devised without departing from the scope of the invention.

I claim:

1. A computer which has first and second data storing portions and receives, from the outside, an instruction including a SWAP instruction that indicates the exchange of information stored in said first and second data storing portions respectively to perform a processing of exchanging said information of said first and second data storing portions respectively if said instruction is said SWAP instruction;

said SWAP instruction comprising first and second partial instructions which are executed in this order;

said computer comprising:

an instruction decoding portion for receiving said instruction to output, to the next stage, instruction information which indicates a first exclusive-OR operation processing and SWAP indication information which indicates said first partial instruction and to output first and second information stored in said first and second data storing portions respectively to first and second buses if said instruction is said first partial instruction of said SWAP instruction, as well as to output, to the next stage, instruction information which indicates a second exclusive-OR operation processing and SWAP indication information which indicates said second partial instruction if said instruction is said second partial instruction of said SWAP instruction;

an instruction executing portion provided on the next stage of said instruction decoding portion for receiving said instruction information and said SWAP indication information to exactly output said instruction information and said SWAP indication information to the next stage, said instruction executing portion storing said data on said first bus in a bus data storing portion and outputting, to the next stage and said first bus, the instruction execution operation result obtained by executing the exclusive-OR operation of said respective data on said first and second buses when said instruction information indicates said first exclusive-OR operation processing, as well as outputting, to the next stage, the instruction execution operation result obtained by executing the exclusive-OR operation of said respective data on said first and second buses when said instruction information indicates a second exclusive-OR operation processing; and a data writing portion provided on the next stage of said instruction executing portion for receiving said instruction information and said SWAP indication information to store, as write data, the result of the exclusive-OR operation of said data stored in said bus data storing portion and said instruction execution operation result in said first data storing portion when said SWAP indication information indicates said first partial instruction, and to store said execution instruction operation result as write data in said second data storing portion when said instruction information indicates said second exclusive-OR operation processing and said SWAP indication information indicates said second partial instruction;

wherein a pipeline parallel processing is performed for said first and second partial instructions in order of said instruction decoding portion, said instruction executing portion and said data writing portion.

2. The computer as defined in claim 1, wherein said first and second data storing portions include first and second registers.

3. The computer as defined in claim 1, wherein said first and second data storing portions include first and second storing areas of an external memory.

4. A computer which has first and second data storing portions and receives, from the outside, an instruction including a SWAP instruction that indicates the exchange of information stored in said first and second data storing portions respectively to perform a processing of exchanging said information of said first and second data storing portions respectively if said instruction is said SWAP instruction;

said SWAP instruction comprising first and second partial instructions which are executed in this order;

said computer comprising:

an instruction decoding portion for receiving said instruction, to output, to the next stage, instruction information which indicates a first exclusive-OR operation processing and SWAP indication information which indicates said first partial instruction and to output first and second information stored in said first and second data storing portions respectively to first and second buses if said instruction is said first partial instruction of said SWAP instruction, as well as to output, to the next stage, instruction information which indicates a second exclusive-OR operation processing and SWAP indication information which indicates said second partial instruction if said instruction is said second partial instruction of said SWAP instruction;

an instruction executing portion provided on the next stage of said instruction decoding portion for receiving said instruction information and said SWAP indication information to exactly output said instruction information and said SWAP indication information to the next stage, said instruction executing portion storing said data on said second bus in a bus data storing portion and outputting, to said first bus, the instruction execution operation result obtained by executing the exclusive-OR operation of said respective data on said first and second buses when said instruction information indicates said first exclusive-OR operation processing or said SWAP indication information indicates said first partial instruction, as well as outputting, to the next stage, the instruction execution operation result obtained by executing the exclusive-OR operation of said respective data on said first and second buses when said instruction information indicates a second exclusive-OR operation processing; and a data writing portion provided on the next stage of said instruction executing portion for receiving said instruction information and said SWAP indication information to store the data stored in said bus data storing portion as write data in said first data storing portion when said SWAP indication information indicates said first exclusive-OR operation processing, and to store said execution instruction operation result as write data in said second data storing portion when said instruction information indicates said second exclusive-OR operation processing and said SWAP indication information indicates said second partial instruction;

wherein a pipeline parallel processing is performed for said first and second partial instructions in order of said instruction decoding portion, said instruction executing portion and said data writing portion.

5. The computer as defined in claim 4, wherein said instruction executing portion stores said data on said second bus in said bus data storing portion when said instruction information indicates a second exclusive-OR operation processing.

6. The computer as defined in claim 4, wherein said instruction executing portion includes an adding portion having an adder and an addition result storing portion, and selecting means for storing said data on said second bus in said addition result storing portion when said SWAP indication information indicates said first partial instruction, and for storing the addition result of said adder in said addition result storing portion when said SWAP indication information does not indicate said first partial instruction, said addition result storing portion being defined as said data storing portion; and wherein said data writing portion fetches said data on said second bus from said addition result storing portion when said SWAP indication information indicates said first partial instruction.

7. The computer as defined in claim 4, wherein said instruction executing portion includes an adding portion having an addition result storing portion, causes said adding portion to execute addition of "0" and said data on said second bus and stores the result of addition in said addition result storing portion when said SWAP indication information indicates said first partial instruction, said addition result storing portion being defined as said data storing portion; and wherein said data writing portion fetches said data on said second bus from said addition result storing portion when said SWAP indication information indicates said first partial instruction.

8. The computer as defined in claim 4, wherein said first and second data storing portions include first and second registers.

9. The computer as defined in claim 4, wherein said first and second data storing portions include first and second storing areas of an external memory.

10. A compiler for generating an object code for a computer capable of pipeline parallel execution of an operation executing processing and a data writing processing which are continuously performed, based on a source code comprising a group of instructions which include a SWAP instruction that indicates the exchange of the contents of first and second information stored in first and second data storing portions respectively, said complier generating, as an object code for an instruction that indicates said SWAP instruction in said source code, a first partial instruction which indicates to execute the exclusive-OR of said first and second information stored in said first and second storing portions respectively so as to obtain a first operation result when performing said operation processing, and indicates to write the same information having the same value as that of said second information to said first storing portion when performing said data writing processing; and a second partial instruction which is executed subsequently to said first partial instruction and indicates to execute the exclusive-OR operation of said second information and said first operation result so as to obtain a second operation result when performing said operation processing and to write said second operation result to said second storing portion when performing said data writing processing.

11. The compiler as defined in claim 10, wherein said same information includes operation result data obtained by the exclusive-OR of said first information and said first operation result.

12. The compiler as defined in claim 10, wherein said same information includes said second information itself.

* * * * *